Feb. 14, 1950     R. H. MUELLER     2,497,789
EQUIPMENT FOR ADJUSTING PACKING AND THE LIKE
Filed Dec. 27, 1946

Inventor
ROBERT H. MUELLER

Cushman, Darby & Cushman
Attorneys

Patented Feb. 14, 1950

2,497,789

UNITED STATES PATENT OFFICE 2,497,789

EQUIPMENT FOR ADJUSTING PACKING AND THE LIKE

Robert H. Mueller, Decatur, Ill., assignor to Mueller Co., Decatur, Ill., a corporation of Illinois Application December 27, 1946, Serial No. 718,754

2 Claims. (Cl. 81—90)

1

The present invention relates to mechanisms for effecting adjustments in confined or inaccessible places, particularly mechanisms for regulating the tightness of packing around a rod such as a valve stem. While more general applications of the invention may come to mind, the drawings disclose equipment applied for the adjustment of the packing around the stem of a gate valve.

A principal object of the invention is to provide packing means around the extending part of such a stem as mentioned above, and a packing adjusting tool, these equipments having cooperating means to enable an attendant to conveniently adjust the packing around the stem. Ancillary to this objective, it is intended to provide a tool or wrench of special design, which is adapted to embrace the head of a valve stem or the like in order to position and support the wrench with relation to the gland nut of the packing to be adjusted.

Various other important objects and applications of the invention will be apparent as the description herein progresses.

In the drawings, which illustrate only one general use of the invention, and one particular construction thereof:

Figure 1:
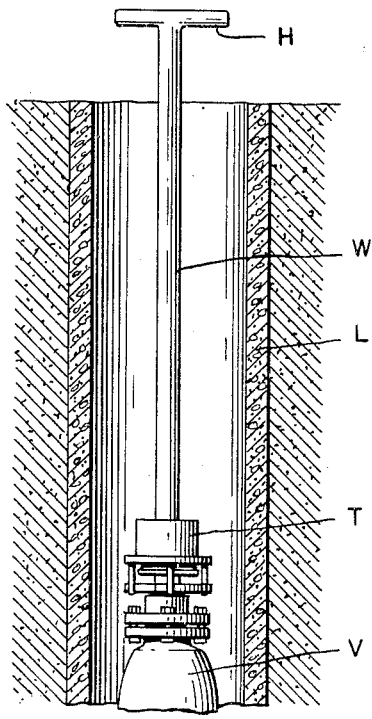
Figure 1 is a generally diagrammatic view showing how the invention is to be used to adjust the packing of such as a valve located in an inaccessible position.
Figure 5:
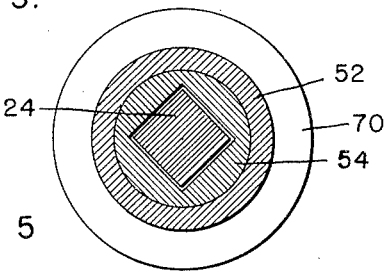
Figure 5 is a horizontal sectional view of the socket of the wrench, taken, for instance, along the line 5—5 of Figure 3.
Figure 4:
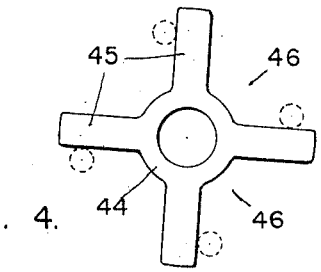
Figure 4 is a top plan view of one form of the packing gland or nut.

In Figure 1, a valve V which may be of the conventional gate type, is shown positioned in a fluid line beneath the surface of the ground, access to the valve being through the well L. The wrench W of the present invention comprises a rod of suitable length, depending on the location of the valves to be operated on, there being a handle end H on said rod and an opposite tool end T, the latter being of improved design for use in adjusting the packing around the stem of the valve V or other body, as hereinafter described.

Figure 2:
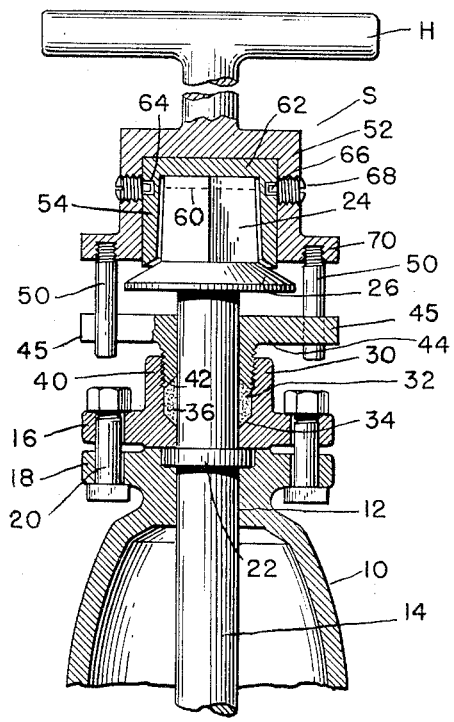
Figure 2 is a vertical sectional view through the housing of a valve, and through the tool end of my improved wrench, disclosing the manner of connection of the latter to adjust a simple packing gland.

Referring to Figure 2, the valve comprises a housing 10 terminating in an outer end having a bore 12 therethrough permitting the valve stem 14, or the like, to extend beyond the housing. The outer end of the housing may be formed in any suitable manner, but in the particular application shown, it comprises a pair of flanged members 16 and 18 which are secured to one another by the conventional bolts 20, the engaging faces of said flange members being suitably formed to receive and confine a collar 22 attached to the stem 14, as is well known in the art, whereby the valve stem may be prevented from moving longitudinally while being turned, in order to move a valve member, as of the gate valve type, to and from its seat. For purposes of opening and closing the valve, the extreme outer end of the valve stem is provided with a head 24, which may be of square or other polygonal form, there being also a tapered skirt 26 extending around the stem inwardly from the head portion 24 thereof. The head 24 preferably has a number of flat side surfaces in order to receive a wrench, as is well known in the art, whereby the stem 14 may be turned to move the valve from and toward its seat.

The flange member 16 is equipped with an outwardly extending cylindrical portion 30, which is hollowed out as at 32 to provide a packing recess having an inwardly tapering bottom 34. Within this recess any suitable packing 36 is provided, and this packing may be compressed by a gland nut having a cylindrical extension 40 in turn having a forward tapered surface 42, said extension 40 being threaded into the open end of the portion 30. The packing follower 40 also comprises an outwardly extending flange portion 44, said flange comprising spaced arms 45 interrupted as by openings 46 to receive the prongs of a wrench member to be hereinafter described. It will be noted that the flange 44 extends laterally of the valve stem 14 to points beyond the extreme outer edge of the flange 26 of the valve stem head 24, and the interruptions 46 are so located in the flange 44 as to be accessible to the prongs 50 of the wrench.

The tool end of the wrench consists of a socket S comprising an outer working cup member 52 and an inner sleeve-like guiding member 54. The sleeve member 54 is of special construction, its inside surface being formed to the same shape as the surface of the head 24, so that when said sleeve engages the head, it will be held against rotation with respect thereto. While the member 54 is disclosed as being of sleeve-like configuration, its design will depend on the shape of the head 24 and the means provided in the formation of the latter for turning the valve stem. For example, the outer end of the head 24 might have a diametrical groove 60, for turning stem 14 as with an ordinary screw driver, in which event the member 54 might comprise only the end annular disc portion 62 of the sleeve, having a cooperating diametrially extending ridge to enter the slot 60 to lock the member to the head against rotation with respect thereto.

In any event, the outside surface of the sleeve 54 is of cylindrical configuration, as is the bore of the cup member 52, so that said cup member may turn on and with respect to the sleeve 54 when adjusting the packing.

The sleeve portion 54 is provided with an external annular groove 64 into which heads 66 of removable screws 68 threaded through the wall of the cup 52 extend. The heads 66 of said screws are somewhat smaller in cross section than that of the groove 64, so that the cup member 52 may turn freely around the sleeve member 54 while being guided thereon. Of course, the screws 68 will prevent the sleeve 54 from dropping from the cup, but at the same time, screws 68 may be removed in order to remove a particular sleeve 54 out, in order to replace same with a new sleeve if the latter becomes worn, or to insert a sleeve having a different inside configuration to cooperate with valve stem or similar heads of different form.

As indicated in the drawings, the inner end of the cup portion 52 of the socket on the tool end of the wrench is provided with an outwardly extending flange 70, and the wrench prongs 50 may be removably attached as by threads at spaced points into the inner face of said flange in order to depend therefrom, the spacing of the wrench prongs 50 generally conforming to the spacing of the openings 46 through the flange 44 in the gland nut, whereby when the wrench socket is applied to the head of the valve, the cup member 52 can be turned around the sleeve 54 until the ends of the prongs align with and drop into the openings 46. Thereafter, the gland may be turned to regulate the compression of the packing 36. For instance, after the valve member has been in use for some time, it may be desirable to tighten up on the packing, and this can be accomplished in an accurate and even manner, by reason of the proper positioning and supporting of the wrench on the head 24.

It will be observed that this equipment may be employed in connection with the packing around any type of stem, particularly around any kind of extending valve stem, such as of the gate valve.

Figure 3:
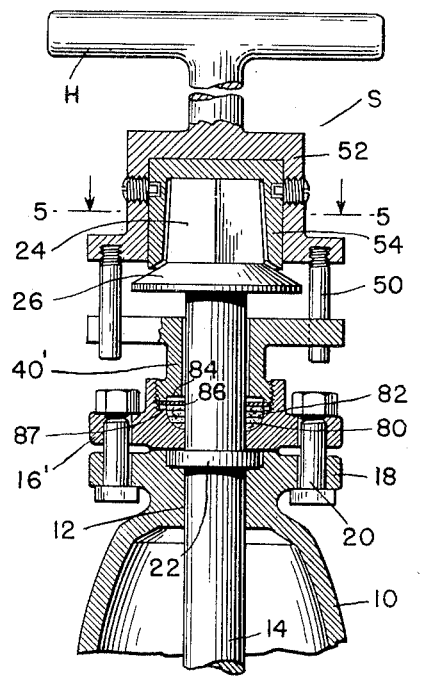
Figure 3 is a view similar to Figure 2, but disclosing the application of the equipment of the present invention to an improved self-regulating type of packing, as covered in my co-pending application Serial No. 718,573, filed December 27, 1946.

In Figure 3, a modification of the invention is disclosed wherein the body or housing of the valve includes a modified type of outer flange member 16', this member having an interior curved bowl-like recess 80 in which packing 82 of a special type is positioned, as fully disclosed and claimed in my co-pending application Serial No. 718,753, filed December 27, 1946. This packing generally comprises alternate layers of rubber and fibrous packing, being initially ringlike in form and of substantially square or rectangular cross section, but being distorted into the shape of the bowl 80 when compressed into the recess by the follower 40' which is threaded into the flange member 16' by the wrench as previously described. The inner face of the gland 40' is recessed or cut-away as at 84 to permit the outward flexing of a spring washer 86 which is forced against the packing 82 by the gland and thus placed under a powerful outward tension adjacent its center, to maintain a continuous compression on said packing 82 as described in the above-referred to co-pending application. As in said application, the parts may be arranged so that a space is provided below or within the outer edge portion of the spring washer, as at 87, so that subsequent adjustments of its flexure may be mechanically made as the packing becomes worn. The accurate alignment of the wrench, and firm support thereof, so that minute turning adjustments of the packing gland may be made, are most desirable in obtaining maximum useful life from such packing arrangements as are described in the said co-pending application.

It will be obvious that various changes in the precise form of the parts disclosed herein may be made, without departing from the scope of the invention. For example, while the flange 44 of the gland is shown with spaced arms 45 having spaced openings 46 between said arms, it will be understood that the interruptions in said flange may be appropriately formed apertures through the flange, the prongs of the wrench being designed to enter such openings.

Various changes in the construction shown herein will occur to those skilled in the art. For instance, while the rod of the wrench is shown as being straight, it may be bent or curved between its ends, for example, if the position of the valve is such that access thereto must be had from the side, rather than from above the valve. Furthermore, the number and arrangement of the wrench extensions or prongs 50 may vary, and they can be of any suitable design, particularly at their ends, to lock with the flange of the gland nut when the wrench is in use.

Reference is made to my co-pending application Serial No. 718,753, filed December 27, 1946, entitled "Packing assembly" for further description of the use of the equipment of this invention. As mentioned in that application, the head of the valve stem may be detachably secured or pinned to the stem in order to permit the assembly on the stem of the packing, resilient washer and other parts as described herein before securing the head.

The subject matter disclosed but not claimed herein is claimed in my co-pending application, Serial No. 718,753, filed December 27, 1946.

I claim:

1. A wrench of the character described for turning a nut or the like around the protruding end of a shaft having a polygonal head thereon, comprising an elongated solid rod having handle and tool ends, said rod having a handle rigidly attached thereto at the extreme outer end thereof, said tool end comprising a working cup with a guiding sleeve therein, the exterior surface of said sleeve and the interior surface of said cup being of corresponding cylindrical form providing for turning movement of said cup on said sleeve around the axis of the tool end of said rod, said sleeve being interiorly formed to the polygonal shape of the head of the shaft to fix said sleeve thereto, the exterior surface of said sleeve having a substantially circular groove therein, said cup having a guiding pin extending through its wall with an end positioned for movement in said groove to prevent dislodgement of said sleeve from said cup while permitting relative turning movement, said cup having nut engaging means extending axially from the tool end of said rod and positioned far enough outwardly from the axis of said rod to pass said head, said means being formed to engage the nut to turn the same with respect to the head of the shaft.

2. A wrench of the character described for turning a nut or the like around the protruding end of a shaft having a head thereon, comprising an elongated solid rod having an inner tool end and an outer end remotely located with respect to said tool end, a handle rigidly connected with said rod at its extreme outer end for turning same, the tool end of said rod being formed to provide a cup fixed on said rod and which is closed except at its inner end, said cup having an internal diameter larger than the head on the shaft and having nut engaging means extending axially inwardly therefrom, said nut engaging means being positioned far enough outwardly from the axis of said rod to pass said head, said means being adapted to engage the nut to turn the same with respect to the head of the shaft, and a guiding member entirely enclosed within said cup and mounted for relative turning movement therein, said guiding member having cooperating means formed to the shape of the head of the shaft to fix said guiding member against rotation on the head and for properly positioning said nut engaging means.

ROBERT H. MUELLER.

REFERENCES CITED

The following references are of record in the file of this patent:

UNITED STATES PATENTS

| Number | Name | Date |
|---|---|---|
| 866,285 | Klie | Sept. 17, 1907 |
| 956,467 | Anderson | Apr. 26, 1910 |
| 1,028,148 | Stroh | June 4, 1912 |
| 1,544,520 | Putrow | June 30, 1925 |
| 2,129,283 | Uytenbogaart | Sept. 6, 1938 |

FOREIGN PATENTS

| Number | Country | Date |
|---|---|---|
| 597,576 | Germany | of 1934 |